United States Patent
Kimoto (10) Patent No.: US 8,042,859 B2
(45) Date of Patent: Oct. 25, 2011

(54) STRUCTURE OF CAR DOOR

(75) Inventor: Tohru Kimoto, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/989,773

(22) PCT Filed: Jul. 31, 2006

(86) PCT No.: PCT/JP2006/315551
§ 371 (c)(1),
(2), (4) Date: Aug. 7, 2008

(87) PCT Pub. No.: WO2007/015564
PCT Pub. Date: Feb. 8, 2007

(65) Prior Publication Data
US 2009/0038232 A1  Feb. 12, 2009

(30) Foreign Application Priority Data

Aug. 2, 2005  (JP) ................. 2005-224303

(51) Int. Cl.
*B60J 1/08*  (2006.01)
(52) U.S. Cl. ............... 296/146.2; 296/146.1; 49/502
(58) Field of Classification Search .............. 49/502; 296/146.5, 203.01, 203.03, 203.04, 146.1, 296/146.2, 146.3, 146.15
See application file for complete search history.

(56) References Cited

U.S. PATENT DOCUMENTS

| | | | | |
|---|---|---|---|---|
| 4,649,668 A | * | 3/1987 | Skillen et al. | 49/374 |
| 4,811,517 A | * | 3/1989 | Eckert et al. | 49/145 |
| 5,139,307 A | * | 8/1992 | Koops et al. | 296/201 |
| 5,168,670 A | * | 12/1992 | Umeda | 49/502 |
| 5,317,835 A | * | 6/1994 | Dupuy et al. | 49/441 |
| 5,566,510 A | * | 10/1996 | Hollingshead et al. | 49/479.1 |
| 5,702,148 A | * | 12/1997 | Vaughan et al. | 296/146.9 |
| 5,779,956 A | * | 7/1998 | Hollingshead et al. | 264/138 |
| 5,846,463 A | * | 12/1998 | Keeney et al. | 264/135 |
| 6,220,650 B1 | * | 4/2001 | Davis et al. | 296/146.16 |
| 6,299,235 B1 | * | 10/2001 | Davis et al. | 296/146.16 |
| 6,394,529 B2 | * | 5/2002 | Davis et al. | 296/146.16 |
| 6,422,639 B1 | * | 7/2002 | Hemauer | 296/146.5 |
| 6,715,821 B2 | * | 4/2004 | Kanie et al. | 296/146.15 |
| 6,729,674 B2 | * | 5/2004 | Davis et al. | 296/146.16 |
| 6,817,651 B2 | * | 11/2004 | Carvalho et al. | 296/146.2 |
| 7,234,756 B2 | * | 6/2007 | Lynam et al. | 296/146.5 |
| 2005/0166462 A1 | * | 8/2005 | Losch et al. | 49/502 |
| 2006/0103047 A1 | * | 5/2006 | Zwolinski | 264/174.11 |

(Continued)

FOREIGN PATENT DOCUMENTS

JP  55-042689 U  3/1980
(Continued)

*Primary Examiner* — Jerry Redman
(74) *Attorney, Agent, or Firm* — Birch, Stewart, Kolasch & Birch, LLP (57) ABSTRACT

A car door is constituted by a main body which includes an outer panel and an inner panel combined together, a door lower half, and a rising part extending upward from the door lower half and facing with a side edge of a roof via an upper part thereof; and a bracket-shaped sash assembly constituted by a front vertical sash whose bottom edge is joined to a front upper end of the door lower half, and a roof-facing sash extending from an upper part of the front longitudinal sash and joined to an upper end of the rising part.

4 Claims, 11 Drawing Sheets

U.S. PATENT DOCUMENTS

2006/0123708 A1* 6/2006 Fuetterer et al. ............ 49/502
2006/0156632 A1* 7/2006 Ruppert et al. ............. 49/502
2007/0125004 A1* 6/2007 Conner et al. ............. 49/502
2009/0038232 A1* 2/2009 Kimoto ...................... 49/502
2010/0064591 A1* 3/2010 Iwabuchi ................. 49/499.1

FOREIGN PATENT DOCUMENTS

| JP | 62-30921 U | 2/1987 |
| JP | 04303018 A * | 10/1992 |
| JP | 6-106992 | 4/1994 |
| JP | 2003-220830 A | 8/2003 |
| JP | 2004-189164 A | 7/2004 |

* cited by examiner

STRUCTURE OF CAR DOOR

BACKGROUND OF THE INVENTION

1. Field of the Invention

This invention relates to a structure of a car door. The car door is constituted by a panel body in which an outer panel and an inner panel are coupled, and a sash assembly supporting a windowpane at an upper part of the panel body.

2. Description of the Related Art

A car is usually provided with doors which enable passengers to comfortably get on and off.

Figure 7A:
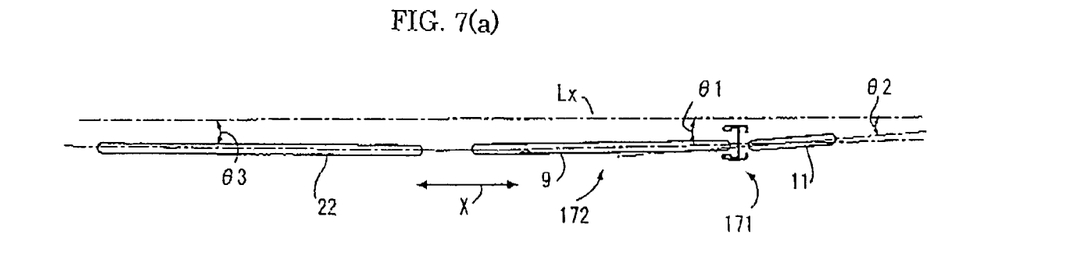
FIG. 7(a) shows how a glass slide and a fixed window attached to the rear door are curved.
Figure 7B:
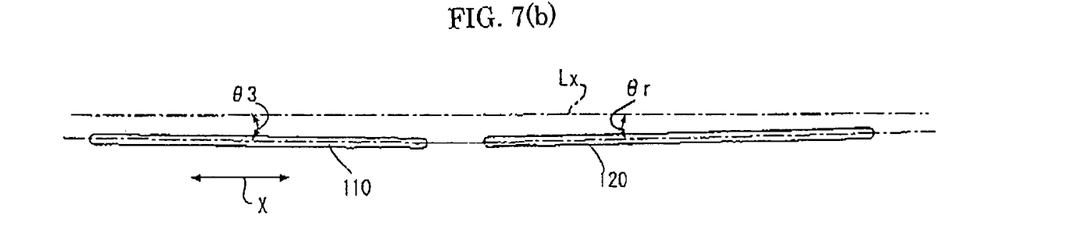
FIG. 7(b) shows how a glass slide and a fixed window to a rear door of the related art are curved.

Cars have a variety of shapes depending upon their applications, and are classified into a sedan having four doors and seats, a hatchback with a door at the back that opens upwards, and so on. The hatchback has a relatively straight contour, and has a uniform width at its front and back in order to improve the comfort of the passenger cabin and the ride. Usually, doors extend substantially straight along the length of the car. In one example of the related art, a windshield 110 attached to each front door and a glass slide 120 attached to each rear door are curved as shown in FIG. 7(b) of the accompanying drawings. The glass slide 120 has its rear end slightly curved by an angle θr toward the center of the car with respect to a base line Lx of the car. The windshield 110 is curved opposite to the glass slide 120 by an angle θ3 with respect to the base line Lx.

Figure 11A:
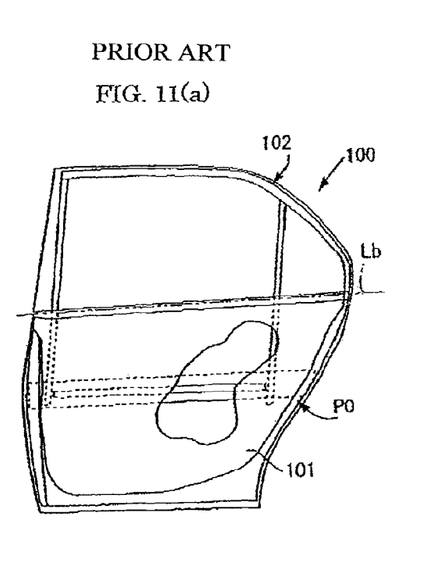
FIG. 11(a) is a schematic front elevation of an inner surface of a rear door having an independently roll-molded sash in the related art.
Figure 11B:
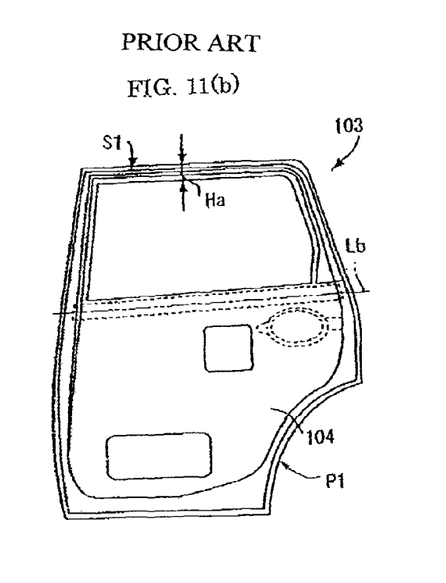
FIG. 11(b) is a schematic front elevation of an inner surface of a press-molded rear door of the related art.

Referring to FIG. 11(a), a door 100 is constituted by a panel body P0 coupling an outer panel (not shown) and an inner panel 101, and a substantially rectangular sash 102. The rectangular sash 102 is independently roll-molded, is coupled to the panel body P0, and projects upward above a belt line Lb of the panel body P0. Referring to FIG. 11(b), a press-molded door 103 includes an outer panel (not shown) and an inner panel 104 which are coupled, a panel body P1 placed below a belt line Lb, and a sash S1 extending above the panel body P1 and the belt line Lb. The panel body P1 and the sash S1 are molded in succession.

Japanese Patent Laid-Open Publication Hei 6-106992 describes one example of the doors including independently molded sashes, and one example of press-molded doors.

It is assumed here that a hatchback has rear doors extending to its rear end, and gradually becomes narrow toward the rear end.

In the foregoing case, rear end pillars come close to the center of a body compared to center pillars. Further, upper parts of the rear doors immediately upstream of the rear end pillars are extensively curved compared with front parts of the rear doors.

When observed from above, each rear door has an upper edge which is constituted by a straight front, and a sloping rear. Accordingly, a door sash has a peripheral edge which is straight at its front and downwardly slopes at its rear.

The sash itself should be three-dimensionally curved in order to accomplish the foregoing shape.

However, it is very difficult to roll-mold the foregoing sash, and existing doors including independently molded sashes are usable only if some modifications are made. In the case of the press-molded door, the outer and inner panels are fabricated in a coupled state. An outer frame and an inner frame above the belt line are press-molded so as to have a straight front and a sloped part, and are coupled, which enables a sash to have a sloping part.

In order to be strong, the sash for the press-molded door has a hollow space, and a hem at an inner peripheral edge, and becomes relatively wide. Referring to FIG. 11(b), a thickness Ha of the roof-facing part of the sash is increased. Accordingly, the roof at an upper part of the door opening is widened. This means reduced degrees of design freedom.

The present invention has been contemplated in order to overcome problems of the related art, and is intended to provide a structure of a rear door which assures design freedom even when a car becomes gradually narrower toward end thereof.

SUMMARY OF THE INVENTION

In order to accomplish the foregoing object, the invention provides a structure of a car door, in which an outer panel and an inner panel are joined to make a main door body, the door main body including a door lower half and a rising part extends upward from the door lower half and facing a side edge of a roof via an upper part thereof, and a bracket-shaped sash assembly is constituted by a front vertical sash whose bottom edge is joined to a front upper end of the door lower half, and a roof-facing sash extending from an upper part of the front vertical sash and joined to an upper end of the rising part.

With the foregoing structure, the roof-facing sash includes a bend at a center thereof along a length of the car, a center sash having an upper end joined to the bend and a lower end joined to the door lower half and the rear door is inclined upstream of the bend by an angle smaller than an angle by which the rear door is inclined downstream of the bend.

Further with the foregoing structure, a glass slide is placed in a space defined by the front longitudinal sash and the center sash; and a stationary pane is fitted in a space defined by the center sash and the rising part.

According to the foregoing structure, the door includes a press-molded main part and a roll-molded sash assembly, both of which are combined. The roll-molded sash assembly has a relatively small width. This is effective in facilitating shaping of a peripheral edge of a roof-facing with the sash assembly. A press-molded rising part promotes the design freedom of the rear part of the rear door.

Further, since the tilt angle of the roof-facing sash downstream of the bend is larger than the tilt angle thereof upstream of the bend, the rear door can be easily applied to a car which is narrowed at the rear end thereof. This is effective in improving the design freedom of the car.

Still further, the glass slide upstream of the center sash can be easily opened and closed. The rear door is applicable to a car whose rear part is narrowed. This promotes the design freedom of the car.

BRIEF DESCRIPTION OF THE DRAWINGS

FIG. (8b) is a cross section of a bend of the roof-facing sash.

DETAILED DESCRIPTION OF THE INVENTION

Figure 1:
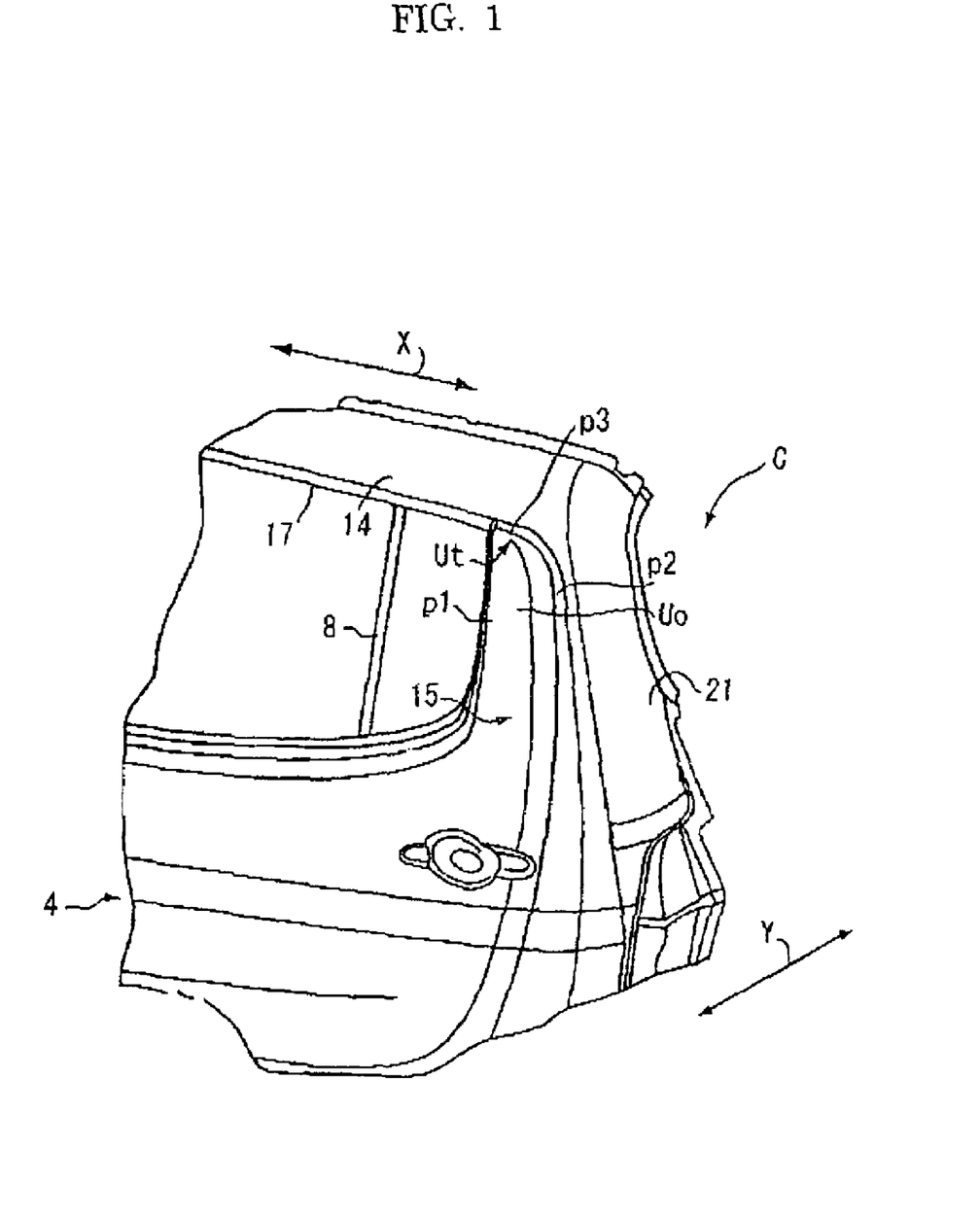
FIG. 1 is a perspective view of a rear part of a car having a rear door structured according to one embodiment of the invention.
Figure 2:
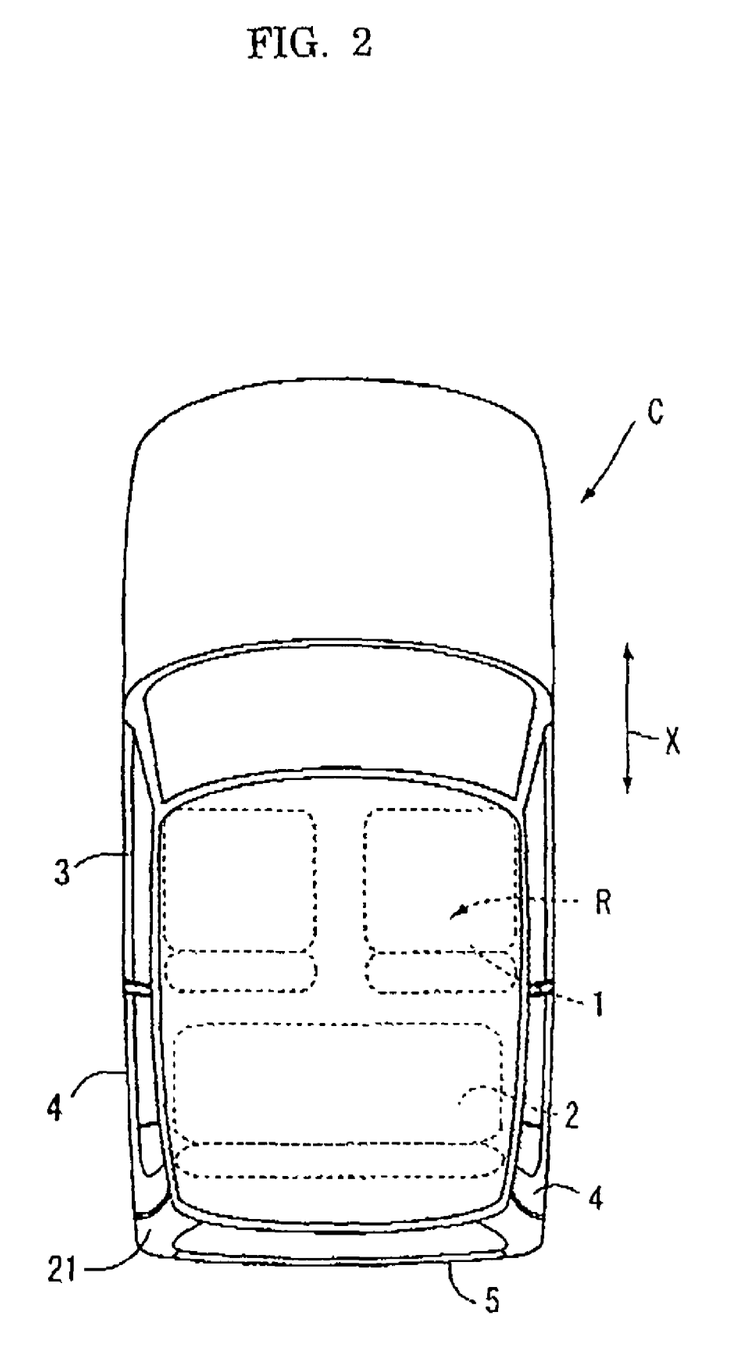
FIG. 2 is a schematic top plan view of the car.

FIG. 1 and FIG. 2 show a hatchback C (called the "car C") provided with rear doors 4 which are structured according to the present invention. Further, the car C includes passenger seats 1 and 2 in its interior R, right and left front doors 3, right and left rear doors 4 and a back door 5 at the back that opens upwards. The front and rear doors 3 and 4 are used for passengers to get in and off. The back door 5 is opened and closed in order to load and unload cabin baggage via a rear opening (not shown).

Each rear door 4 has its front edge hinged to a peripheral edge of a rear opening, and its rear edge locked to and unlocked from each rear end pillar using a latch or striker (not shown).

Figure 3:
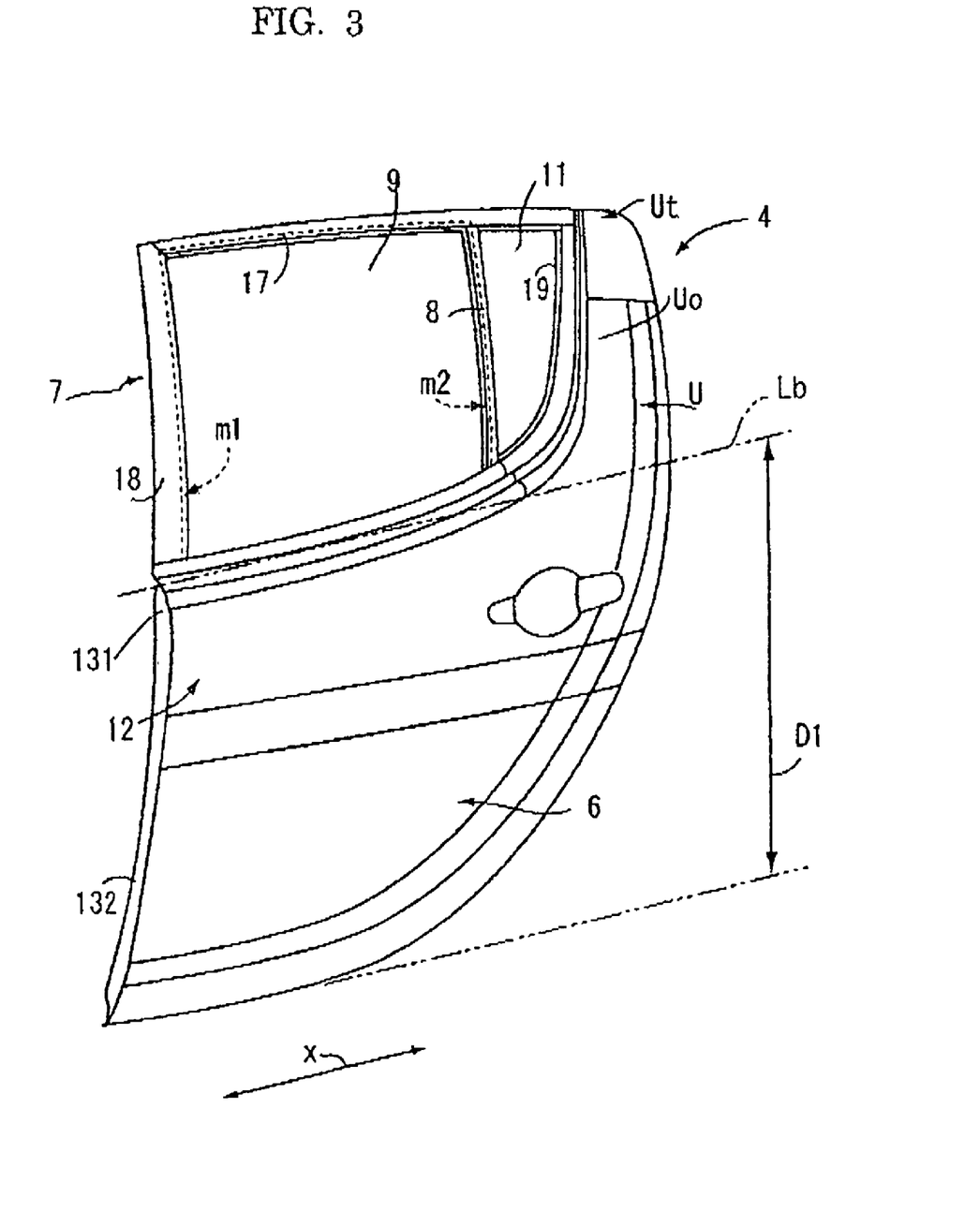
FIG. 3 is an enlarged perspective view of the rear door of FIG. 1.

As shown in FIG. 3, each rear door 4 is constituted by a door main body 6; a bracket-shaped sash assembly 7 (called the "sash assembly 7") which is integral to the door main body 6; a center sash 8 extending between the sash assembly 7 and the door main body 6; a glass slide 9 and a stationary pane 11 supported by the sash assembly 7; a door knob (not shown); and accessories used to attach the foregoing components.

Figure 9:
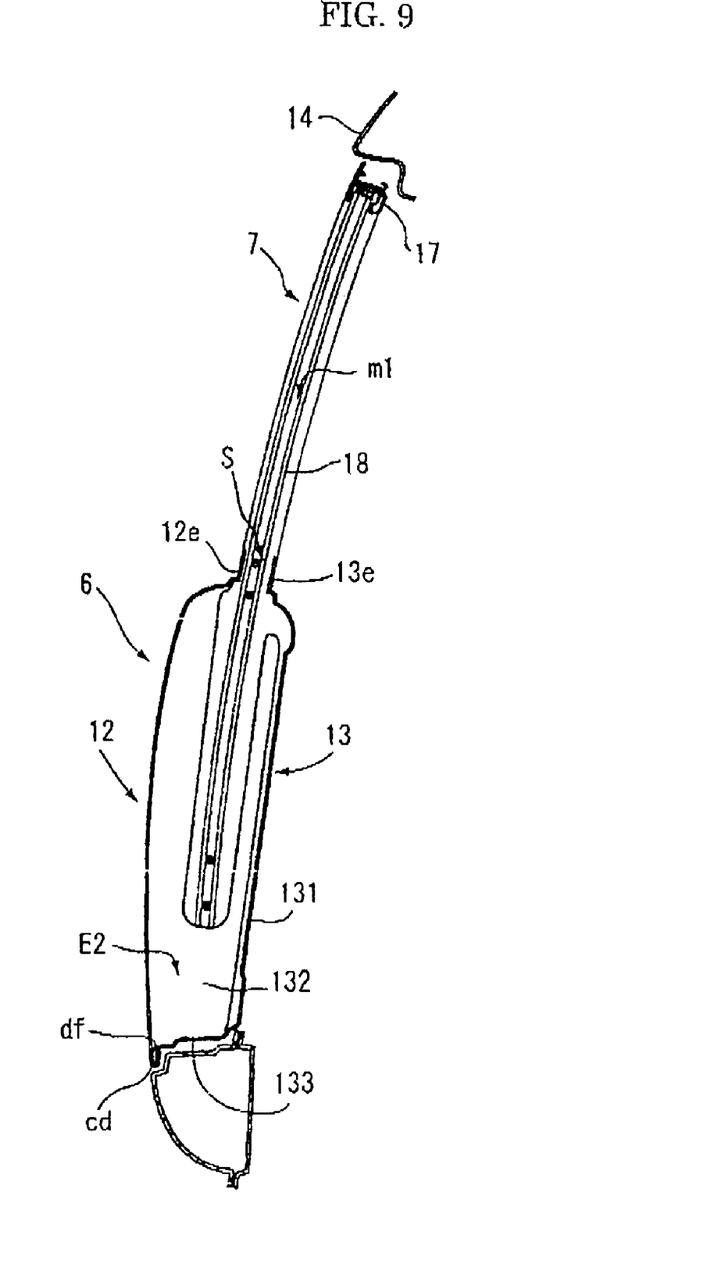
FIG. 9 is a longitudinal section of relevant part of the rear door in FIG. 3.

Referring to FIG. 9, an outer panel 12 and an inner panel 13 are coupled in order to define a space E2 in the door main body 6. Further, a door lower-half D1 is placed under a belt line Lb (shown in FIG. 3), and a rising part U extends from an upper part of the door lower-half D1.

Further as shown FIG. 9, the inner panel 13 is constituted by a main part 131; a lower peripheral edge 132 and a bottom peripheral edge 133 which are bent and extend toward the outer panel 12; and a flange df extending from the peripheral edges 132 and 133. The flange df is covered by a part cd engaged with a peripheral edge of the outer panel 12, and is hemmed. A door panel space S exists between upper peripheries 12e and 13e of the outer and inner panels 12 and 13. A front vertical sash l8 is placed at a front end of the door panel space S while a center sash 8 is placed at the center of the door panel space S.

The rising part U extends from the upper part of the door lower-half D1, and has an upper end Ut facing a roof side rail 14 (attached to the roof of the car C).

Figure 4:
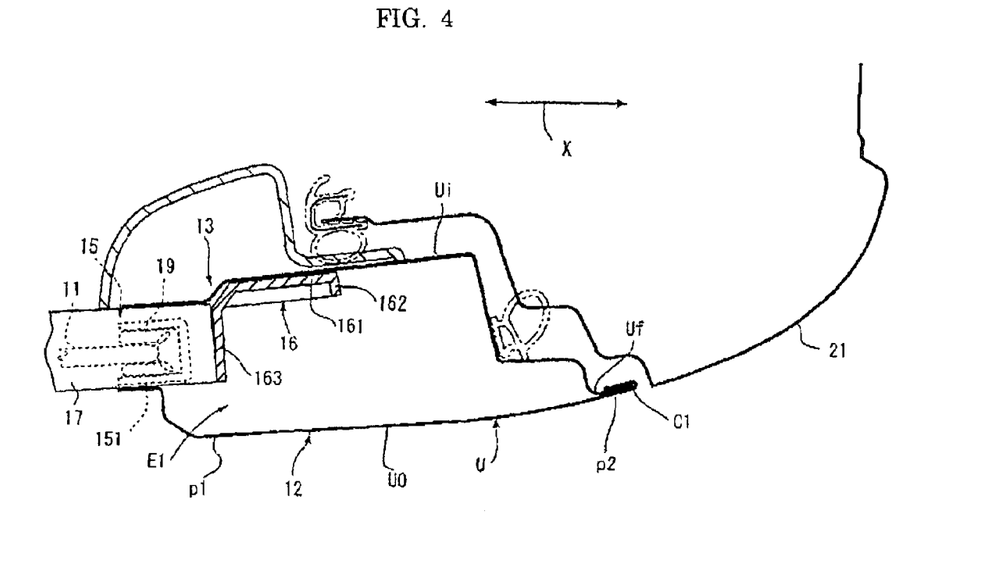
FIG. 4 is a cross section of a top of a rising part of the rear door shown in FIG. 3, when viewed from above.

As shown in FIG. 4, a part Uo of the rising part U (of the outer panel 12) and a part Ui of the inner panel 13 are joined via a space E1. Therefore, an end flange Uf of the part Ui is covered by an end c1, so that both of them are hemmed.

Figure 5:
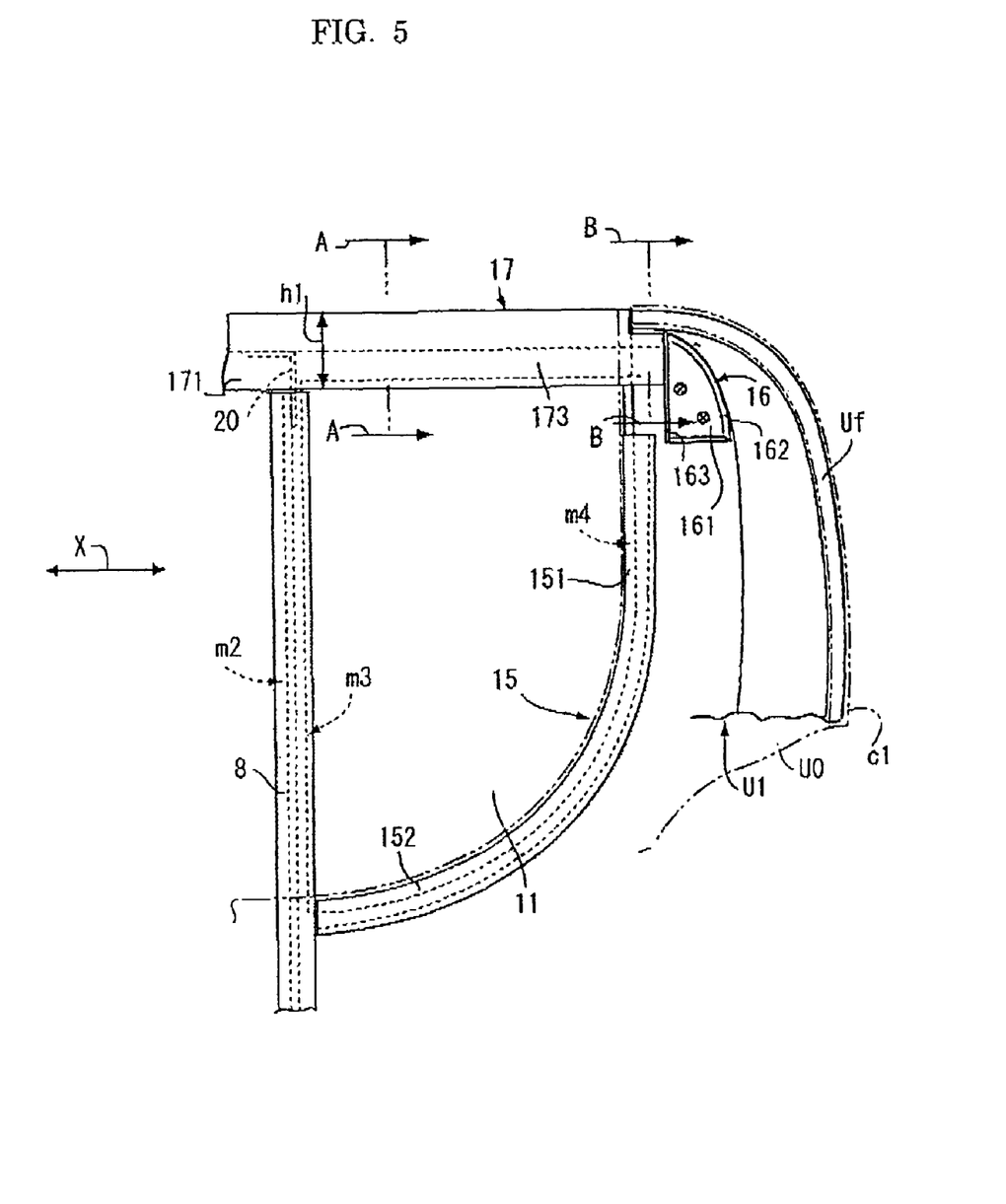
FIG. 5 is a cross section of a relevant part of the rising part, with an outer panel of the rear door omitted.

A sash bracket 16 is placed at an upper part of the space E1. Specifically, the sash bracket 16 includes a base 161 and a peripheral flange 162. The base 161 is welded to the part Ui of the inner panel 13 at a plurality of points. Referring to FIG. 5, a rear end of a roof-facing sash 17 (to be described later) is in contact with an upper part of a front flange 163 of the sash bracket 16, and is welded together.

Figure 6A:
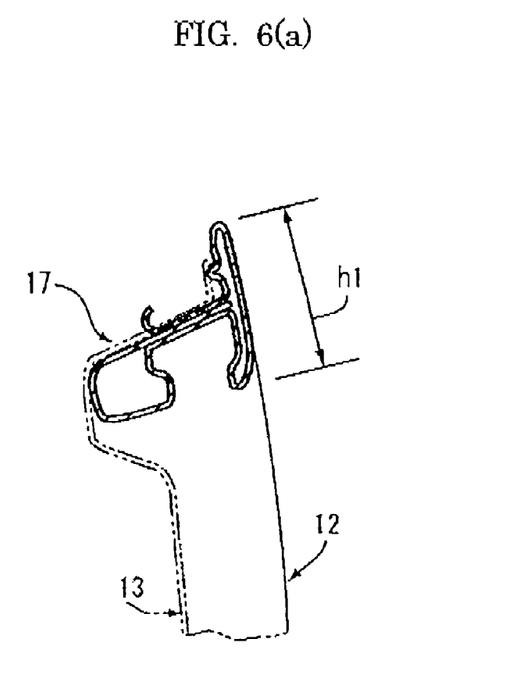
FIG. 6(a) is a cross section of the a roof-facing sash, taken along line A-A in FIG. 5.
Figure 6B:
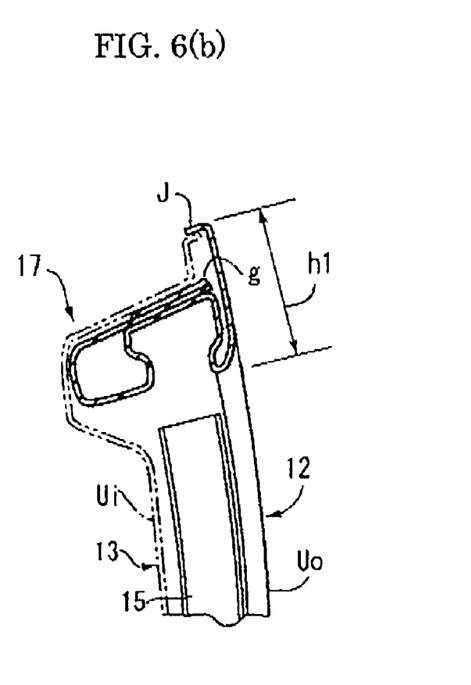
FIG. 6(b) is a cross section of the roof-facing sash, taken along line B-B in FIG. 5.

The rear end of the roof-facing sash 17 is engaged between the part Ui of the inner panel 13 and the part Uo of the outer panel 12, and is joined to the part Ui via the sash bracket 16. Referring to FIG. 6(b), the roof-facing sash 17 has its top partly cut, so that the part Ui is placed on a cut part g. The part Ui extends upward and comes into contact with the part Uo of the outer panel 12 at a position J (where the roof-facing sash 17 overlaps with the outer panel 12 for a length h1, i.e. a height of the roof-facing sash 17, as shown in FIG. 6(a) and FIG. 6(b)).

A curved glass receptacle 15 (called the glass receptacle 15) for receiving a stationary pane 11 has a cross section in the shape of sideways letter U, and is sandwiched between the part Ui and part Uo. Inner and outer walls of the glass receptacle 15 are welded to the parts Ui and Uo at a plurality of positions. As shown in FIG. 4 and FIG. 5, the glass receptacle 15 includes a rear upright part 151, and a lower part 152 curving forward from the rear upright part 151. The stationary pane 11 has its rear end and a curved end fitted into a groove m4 via a weather strip 19 (shown in FIG. 4).

Figure 8A:
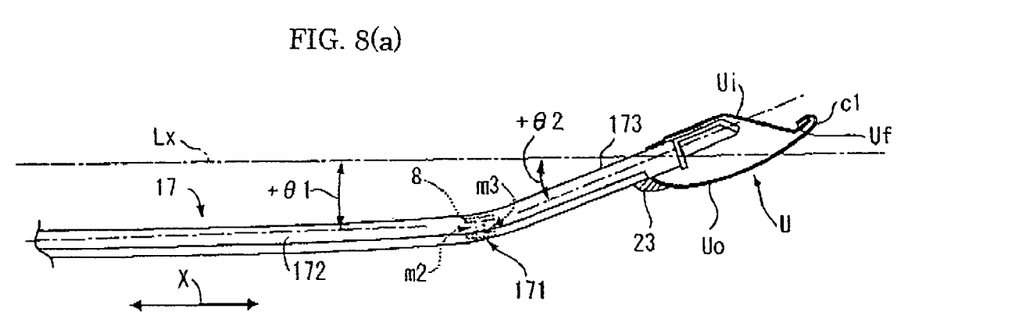
FIG. 8(a) is an enlarged cutaway view of the roof-facing sash in the rear door shown in FIG. 3.
Figure 8B:
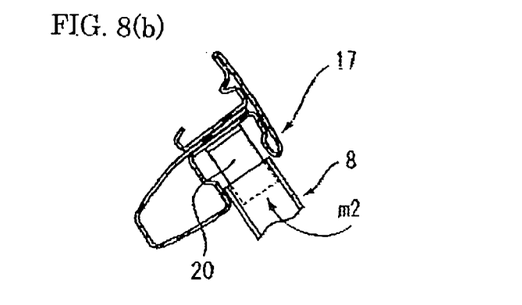

In FIG. 8(a) and FIG. 8(b), reference numeral 23 represents a stationary weather strip covering a clearance between the part Uo, the rear end of the roof-facing sash 17, and the stationary pane 11.

Referring to FIG. 1 and FIG. 4, a door wall defined by the part Uo has a three-dimensionally curved surface, which expands most outward at a front center p1 of the part Uo and gradually recedes near a rear end p2 of the part Uo. The rear end p2 of the part Uo is curved in accordance with a side wall of a rear end pillar 21 of the car body. Further, the door wall has the three-dimensionally curved surface which expands most outward at the front center p1 and gradually recedes toward an upper end p3 of the part Ui. The upper end Ut of the part Ui extends toward a rood side rail 14.

As shown in FIG. 3, the sash assembly 7 is constituted by the front vertical sash 18 and the roof-facing sash 17. Referring to FIG. 9, the front vertical sash 18 overlaps with the peripheral edge 132 of the inner panel 13, and is welded. A front end of the roof-facing sash 17 is brought into contact and is joined to the top end of the front vertical sash 18, so that the rear end of the roof-facing sash 17 extends to the upper end Ut of the rising part U, and is welded. The sash assembly 7 is roll-molded, and is shaped as shown in FIG. 6(a) and FIG. 6(b) in order to be strong enough. This enable the roof-facing sash 17 to have the relatively small height h1, and enables the roof side rail 14 to be shaped with great freedom. Further, this improves the design freedom of the car.

Referring to FIG. 8(a) and FIG. 8(b), a bend 171 is made at the center of the roof-facing sash 17 extending in a direction X. An upper edge of the center sash 8 is in contact with a lower edge of the bend 171. The center sash 8 and the roof-facing sash 17 are joined via a bracket 20. The lower edge of the center sash 8 is joined via a sash bracket (not shown) to an inner wall of the inner panel 13 at the lower half D1 of the door.

The center sash 8 is in the shape of letter H as shown in FIG. 3, FIG. 8(a) and FIG. 8(b), and is placed parallel to the front vertical sash 18. The glass slide 9 is fitted in a groove m1 of the vertical sash 18 and in a front groove m2 of the center sash 8 via a glass-holding channel (not shown). The glass slide 9 is movable in the grooves m1 and m2, and has its lower edge joined to a glass support (not shown). The glass support is moved up and down by a window regulator (not shown) provided on the inner wall of the inner panel 13.

The stationary pane 11 has its front, rear and bottom edges fitted in a rear groove m3 of the center sash 8 and a front groove m4 of the glass receptacle 15 via a weather strip (not shown). Further, an upper edge of the stationary pane 11 is attached to a rear part 173 of the roof-facing sash 17 using another weather strip (not shown). The rear part 173 will be described later.

As shown in FIG. 8(a) and FIG. 8(b), the roof-facing sash 17 at a part 172 has a tilt angle θ1, in front of the bend 171, with respect to the reference line Lx extending in the direction X along the length of the car, and has a tilt angle θ2, at the rear part 173 downstream of the bend 171. The tilt angle θ2 is larger than the tilt angle θ1. Specifically, the roof-facing sash 17 is sharply inclined by the tilt angle θ2 downstream of the bend 171 near the stationary pane 11, as shown in FIG. 7(a). A front glass slide 22 is inclined by a tilt angle θ3 with respect to the reference line Lx. Inclination of the front glass side 22 is opposite to that of the glass slide 9.

The glass slide 9 has the tilt angle θ1 in the direction X, and the stationary pane 11 has the tilt angle θ2. The slide glass 9 is mildly curved toward the center of the car body while the stationary pane 11 is sharply curved toward the center of the car body. When viewing from upward, the roof facing sash 17 and the rising part U are curved toward the center of the car body.

The rear door 4 shown in FIG. 3 includes the press-molded door main body 6 and the roll-molded sash assembly 7, both of which are combined. In short, the rear door 4 has its upper part engaged with the sash 7, and the rising part U connected to the rear end of the sash 7. The roof-facing sash 17 has the relatively small height h1 as shown in FIG. 5. This is effective in promoting the design freedom of the roof side rail 14 facing the roof-facing sash 17. The press-molded rising part U promotes the design freedom of the rear part of the rear door 4.

With the rear door in FIG. 1, the angle θ2 is larger than the angle θ1 as described above. Since the tilt angle θ2 of the stationary pane 11 can be easily increased compared to the tilt angle θ1 of the glass slide 9, the rear door 4 is easily applicable to a car which is narrowed at the rear end thereof. This is effective in improving the design freedom of the car.

Still further, the glass slide 9 upstream of the center sash 8 can be easily opened and closed. The stationary pane 11 can be positioned near the center of the car body. The rear door 4 is applicable to a car whose rear part is narrowed. This promotes the design freedom of the car.

Figure 10A:
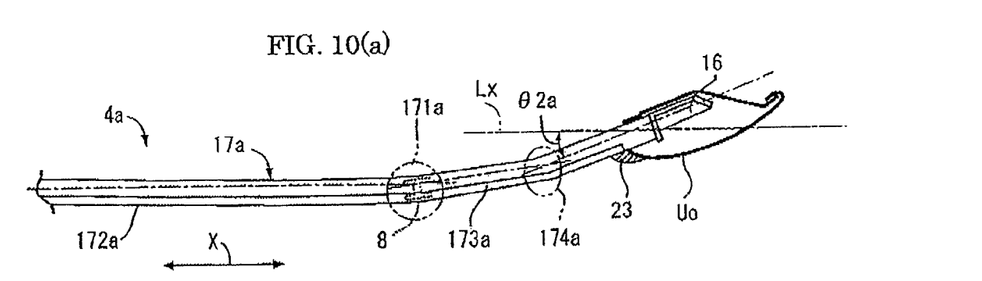
FIG. 10(a) is a schematic top plan view of a modified example of a roof-facing sash.
Figure 10B:
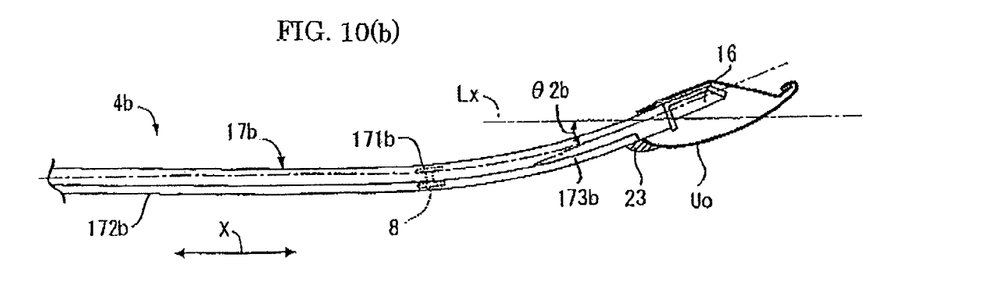
FIG. 10(b) is a schematic top plan view of a roof-facing sash in a further modified example.

In the foregoing embodiment, the sash assembly 7 includes the roof facing sash 17 which has the front and rear parts 172 and 173 near the bend 171. The rear part 173 and the stationary pane 11 are sloped by the angle θ2 toward the center of the car with respect to the reference line Lx. Alternatively, a roof-facing sash 17a of a rear door 4a may have a front part 172a, a bend 171a and a rear part 173a. The rear part 173a may be positioned by making a second bend 174a at the center of the roof-facing sash 17a as shown in FIG. 10(a). Further, a rear door 4b may have a rear part 173b smoothly curved in the direction X as shown in FIG. 10(b). The rear doors 4a and 4b can be easily shaped to have tilt angles θ2a and θ2b along the reference line Lx in the direction X. These doors are easily applicable to cars whose rear ends are narrowed toward the center of the car, and improve the design freedom of cars.

The present invention has been described to be applied to the hatchback having four doors. Needless to say, the invention is applicable to cars having two doors, and is as advantageous as the rear door shown in FIG. 1.

INDUSTRIAL APPLICABILITY

The structure according to the invention is applicable to cars, especially sedans or hatchbacks which are gradually narrowed toward rear ends thereof, and improves the design freedom.

What is claimed is:

1. A structure of a door of a vehicle, comprising:
a main door body including an outer panel and an inner panel joined to one another, the outer panel and the inner panel forming a door lower half as well as a rising part having a surface common with the outer panel and extending upward from a rear upper end of the door lower half and facing a side edge of a roof via an upper part thereof;
a bracket-shaped sash assembly including a front vertical sash joined to an upper end of the door lower half, and a roof-facing sash extending in a horizontal direction from an upper end of the front vertical sash and joined to an upper end of the rising part, the roof-facing sash including a bend, such that, in plan view, the roof-facing sash at a rear of the bend inclines, with respect to a center line of the vehicle that extends in a longitudinal direction of the vehicle, in a lateral direction of the vehicle and toward the center line, by an angle larger than an angle by which the roof-facing sash at a front of the bend is inclined, with respect to the center line, in the lateral direction of the vehicle and towards the center line of the vehicle; and
a center sash having an upper end joined to the bend and a lower end joined to the door lower half.

2. The structure according to claim 1, further comprising:
a glass slide placed in a space defined by the front vertical sash and the center sash; and
a stationary pane window fitted in a space defined by the center sash and the rising part.

3. The structure according to claim 1, wherein the door is a rear door of the vehicle.

4. A door structure of a vehicle, comprising:
a door panel having a panel forming a door lower half as well as a rising part, the rising part extending upward from a first end of the door lower half and facing a side edge of a roof via an upper part thereof;
a bracket-shaped sash assembly including a vertical sash joined to an upper end of the door lower half, and a roof-facing sash extending in a horizontal direction from an upper end of the vertical sash and joined to an upper end of the rising part, the roof-facing sash including a bend, such that, in plan view, the roof-facing sash at a rear of the bend inclines, with respect to a center line of the vehicle that extends in a longitudinal direction of the vehicle, in a lateral direction of the vehicle and toward the center line, by an angle larger than an angle by which the roof-facing sash at a front of the bend is inclined, with respect to the center line, in the lateral direction of the vehicle and towards the center line of the vehicle; and
a center sash having an upper end joined to the bend and a lower end joined to the door lower half.

* * * * *